Dec. 3, 1963  F. BRYANT  3,112,845
BULK FLUID TRANSPORT
Filed Nov. 25, 1960  2 Sheets-Sheet 1
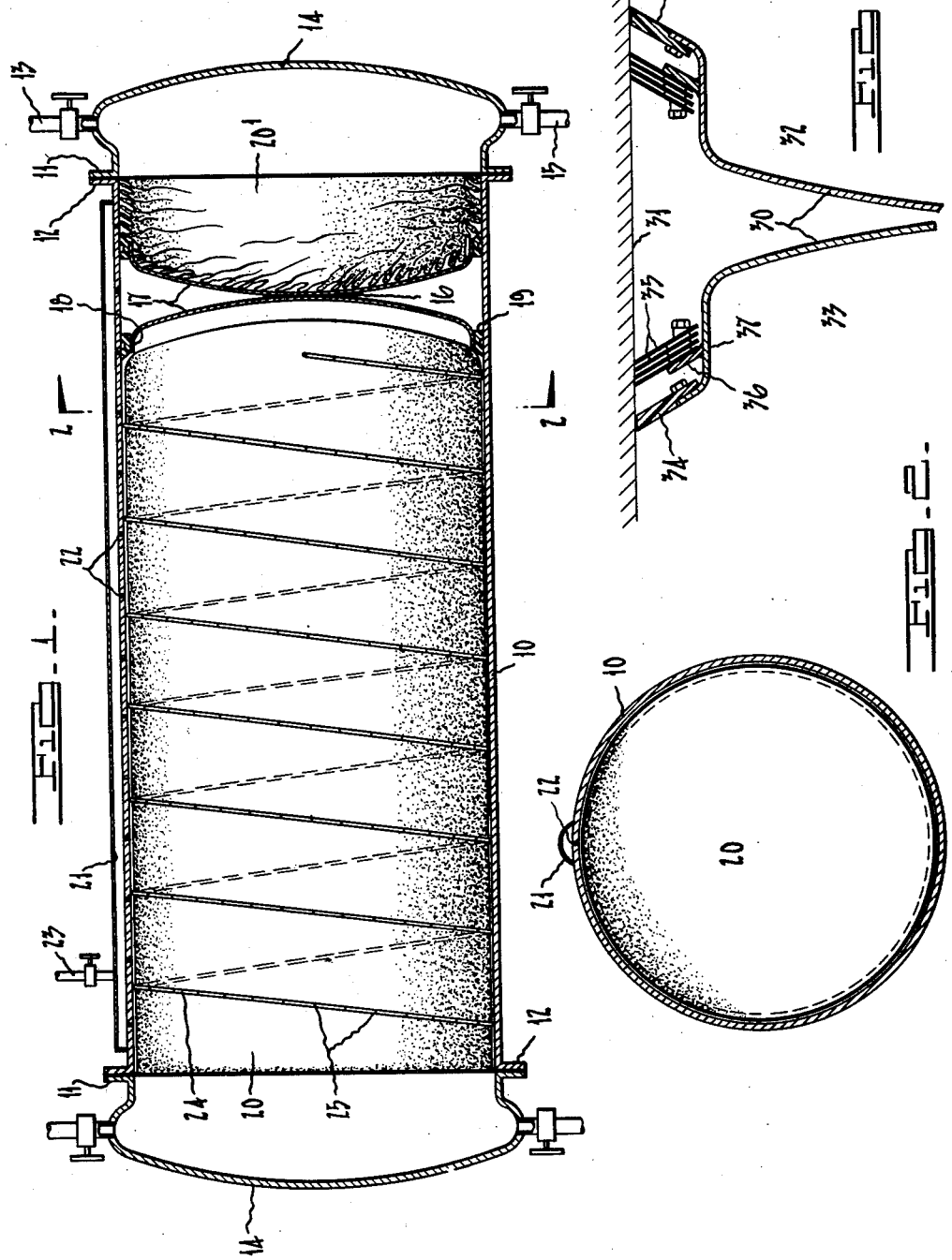

Dec. 3, 1963    F. BRYANT    3,112,845
BULK FLUID TRANSPORT
Filed Nov. 25, 1960    2 Sheets-Sheet 2
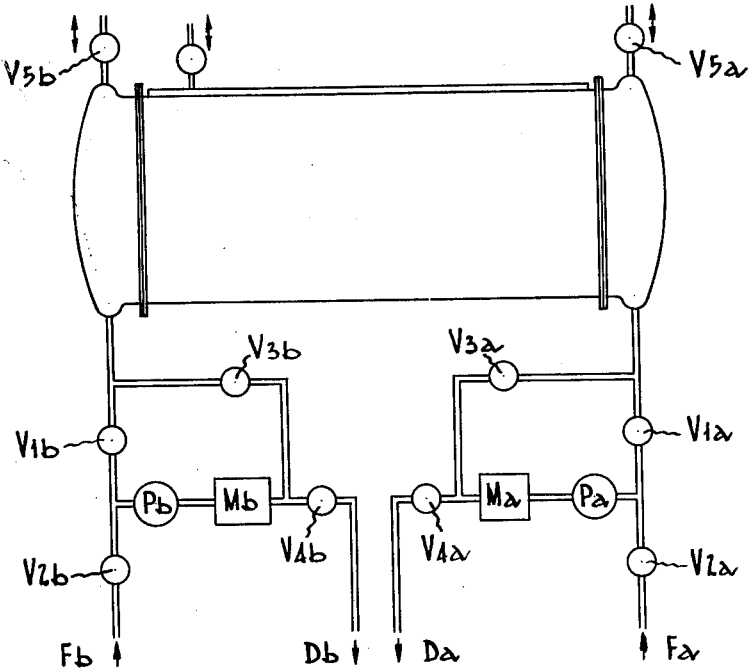
FIG. 4.
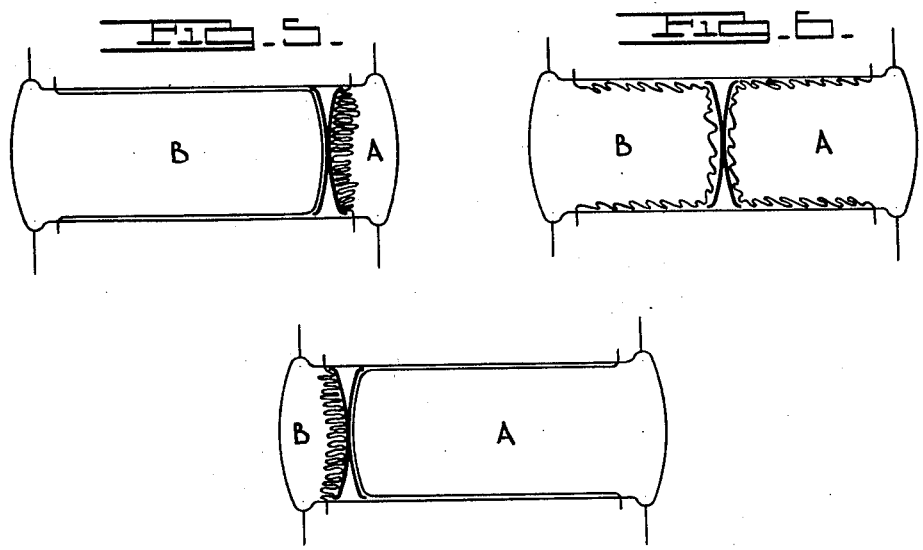
FIG. 5.    FIG. 6.
FIG. 7.

3,112,845
BULK FLUID TRANSPORT
Frederick Bryant, 30 O'Shannessy St., Nunawading, Victoria, Australia
Filed Nov. 25, 1960, Ser. No. 71,716
Claims priority, application Australia Nov. 27, 1959
6 Claims. (Cl. 222—129)

This invention relates to tanks for the transportation of flowable material and refers more particularly to a tank of the type adapted for transportation of two fluids which it is desired should not mix or come into contact.

Most bulk fluid transport tanks at present in operation provide for the transportation of only one fluid with the result that it is usual for the transport to make its return journey with an empty tank. The inability to transport different fluids in the one tank has resulted in high operation costs. Whilst several attempts have been made to overcome this disadvantage, as yet, none of these has proved to be entirely satisfactory and it is accordingly an object of the present invention to provide a bulk liquid transport which will enable the transportation of two fluids which, if desired, should not mix or come into contact. A further object of the invention is to provide such a transport which is simple in its construction and efficient in its operation.

A bulk fluid transport tank according to one broad form of the invention, comprises a bulk fluid transport tank comprising a main tank having a piston movable therein, filler and air release openings in the tank, said openings being so arranged that in all positions of the piston, there is a filler and air release opening in the tank at each side of said piston.

More particularly, a flexible bag is inserted in the tank on the forward side of the piston whilst another flexible bag is inserted in the tank at the rear side of the piston, the first mentioned bag communicating with filler and air release openings in the forward end of the tank whilst the second mentioned bag communicates with filler and air release openings in the rear end of the tank.

A feature of one form of the invention resides in the arrangement of the bags so that when filled, each bag occupies substantially the complete tank, the free space on the opposite side of the piston being such as to allow for contraction or expansion of the fluid, since this free space may be above, at, or below atmospheric pressure depending on the position of the air release valve in the free space.

Other features of the invention will become apparent from the ensuing description of a preferred form of the invention wherein reference is made to the accompanying drawings, in which:

FIGURE 1 is a sectional elevational view of a transport tank according to the invention, FIGURE 2 is a cross-sectional view taken along the line 2—2 of FIG. 1, FIGURE 3 is an enlarged sectional view of a portion of a piston according to a modification of the invention, FIGURE 4 is a diagrammatic illustration of a filling and emptying system for the tank according to FIG. 1, and FIGURES 5 to 7 are diagrammatic illustrations of the tank shown in FIG. 1 showing various positions occupied by the piston and flexible bags.

A bulk fluid transport according to one form of the invention resides in the provision of a main outer tank 10 of any cross sectional shape including the preferred cylindrical and elliptical forms, each end 14 of said tank 10 being flanged at 11 so as to be greater in cross section than the main body 10 of the tank, said flanged ends 11 being attached by bolts or other suitable means to similarly flanged portions 12 on the main body 10 of the tank. A valve 13 for the elimination of air is arranged in the upper portion of each end 14 whilst drain openings 15 are provided substantially directly therebeneath. The drain openings 15 may also serve as filler openings. The end walls 14 may each be provided with inspection and cleaning openings (not shown) so that maintenance may be readily carried out. A piston 16 formed from any suitable rigid material is movable longitudinally within the main tank 10, said piston 16 being formed in a manner appropriate to the cross sectional shape, being preferably formed from concave surfaces 17 which are attached back to back with their convex surfaces in near or actual contact. The discs 17 may be further attached by means of a plurality of spacing or joining bars (not shown) welded or otherwise secured to the convex surfaces of the discs. The circumference 18 of each disc 17 is provided with a suitable sealing material 19 so that a substantially fluid tight connection is made between the piston and the cylinder wall. By reason of the piston 16 being formed in the aforesaid manner the distance between the circumferential edges of the discs are of such a ratio to the cross sectional area of the tank that the possibility of the piston tilting or jamming is eliminated.

A pair of flexible bags 20, 20$^1$ of polyethylene, polytetrafluorethylene or the like are arranged within the tank, one on either side of the piston, the free ends of the said bags 20, 20$^1$ being secured to the tank wall by being clamped between the flanges 11 and 12 of ends 14 and tank 10 respectively. Each flexible bag is of such size that when completely filled, it occupies substantially the full tank as is shown by bag 20 of FIG. 1. A vacuum manifold 21 is so arranged that the air between the bag and the tank wall may be withdrawn through holes or slots 22 in the tank and thence through the outlet 23 in the manifold thereby causing the empty bag to be held against the cylinder wall, thereby minimising the bag wear and facilitating filling and emptying. Further, the application of vacuum has the advantage of immediate removal of any vapour which may permeate the bags. The piston and vacuum openings are preferably so arranged that the space between the piston discs is always under vacuum. The bags may be provided with helically wound tubing 24 of polyethylene or the like bonded to the bag, the tubing being provided at spaced intervals with holes 25 which permit the escape of air to the vacuum manifold. When one or both bags are dispensed with the vacuum manifold is eliminated.

Referring to the embodiment illustrated in FIG. 3 one of the bags 20, 20$^1$ may be dispensed with and the piston 30 is modified so that a vapour and/or liquid tight seal may be obtained between said piston 30 and cylinder wall 31. A perfect seal is not required when two bags are used but must be provided when only one bag is used otherwise the free liquid would be permitted to leak from one side 32 of the piston 30 to the other side 33. In order to obtain this seal the piston 30 is of the same general construction as the piston 16, but may be fabricated to the appropriate tolerances and sealing pressures and provided with a tapered leading edge 34 so shaped as to peel the bag from the cylinder wall. To the rear of this edge 34 there is provided a plurality of sealing strips or blades 35 of "Teflon" or the like. The blades 35 are fixed to a support 36 welded or otherwise attached to the flanged circumferential edge 37 of the piston 30.

In describing a preferred method of filling and emptying the tank, reference will be made to FIGS. 4 to 7 of the drawings. For the sake of convenience, it will be assumed that the tank is to transport petroleum on its outward journey and milk on its return journey. Before commencing the filling of tank "A" it is necessary to make sure that the piston is at the "A" end of the tank. The filling hose is then coupled to the filler coupling FA and valves V1a and V4a are closed and valves V2a and V3a are opened. Vent valve V5a is opened and vent valve V5b is closed thereby allowing the escape of air from the tank "A" but not from tank "B." The meter Ma registers or measures the quantity delivered to tank "A," the maximum quantity being determined by the free space in tank "B" necessary to allow for expansion of the product in tank "A" and the pump Pa is started.

After the pump Pa has been operating for some time, the pressure due to the height of liquid now in tank "A" will cause the piston P to move towards end B of the tank and as the air entrapped in tank "B" cannot escape, pressure is built up therein. When the piston comes to rest the tank "A" will be full. Valve V5a is then closed and valve V5b is opened sufficiently so that the piston will move to allow for the volume delivered by the pump Pa. Valves V2a and V3a are closed and the filling hose disconnected.

In order to effect partial discharge of the product from tank "A" it should first be checked that valve V5b is open thus allowing the piston to follow the product as it is discharged. The meter Ma is used to measure the quantity delivered, the discharge hose is connected at Da and valves V1a and V4a are opened. The pump is then started. On completion of the partial discharge, these valves are closed.

For complete discharge and draining of tank "A," valve V5a is opened in addition to valve V5b, and the operation then proceeds as for partial discharge. For complete drainage, it is preferable for the bag in tank "A" (when a bag is used) to be completely elongated. To do this, valve V5b is closed and pump Pb is operated as a vacuum pump. The reduction in pressure in tank "B" will cause the piston to be returned to the end B of the tank. The tank may then be tilted to assist draining.

To fill tank "B" for the return journey, the piston is now at end B of the tank. If bag B is clean and ready to receive the second product which in this case is milk, then filling proceeds as for tank "A."

Throughout the filling, carrying and discharging operations, vacuum is applied to the tank through the vacuum manifold thereby causing the faces of the bags to be maintained against the cylinder wall and also having the advantage of immediate removal of any vapour which may permeate through a bag.

It will therefore be seen that by the present invention, there is provided a system which makes it possible for a tank transport to carry different liquid loads on both outward and return journeys thereby resulting in considerable saving in both capital and operation costs. Even though the two liquids to be transported are incompatible, the transportation thereof may be successfully carried out since at no time do the liquids come in contact with the same surfaces.

It will further be realized that the invention may be used for transporting incompatible fluids at the same time, i.e. say petroleum in the tank "A" and milk in tank "B" without any danger of contamination.

Although the invention has been described with reference to the transportation of petroleum and milk, it will be realized that these products have been used purely as examples. The invention could be used equally effectively for the transportation of flour, grain or other flowable bulk material.

The invention is particularly advantageous for large transport tanks wherein it is often desirable to only partially deliver the load and wherein it is currently necessary to provide baffles and/or strengthening members. By the present invention, however, these are dispensed with and the full capacity of the tank is used to advantage.

I claim:

1. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein, said bag being so arranged as to communicate with one pair of filler and air release openings at one side of said piston, said bag being formed of polyethylene, polytetrafluorethylene or the like and being provided with plastic tubing arranged helically about the surface of said bag, said tank being further characterized in that a vacuum manifold is arranged on the outer surface of the tank and communicates with the interior of said tank, said manifold being coupled to exhaust means whereby air may be withdrawn from between the bag and the tank wall thereby causing an empty bag to be held against the tank wall and effecting withdrawal from the tank of any vapour which may permeate the bag.

2. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein at each side of said piston, each bag being so arranged as to communicate at its open end with a pair of filler and air release openings at its respective side of the piston and each bag being capable of occupying substantially the complete tank when filled, each of said bags being formed from polyethylene, polytetrafluorethylene or the like and being provided with plastic tubing wound helically about the cylindrical surface of said bag, said tank being further characterized in that a vacuum manifold is arranged on the outer surface of the tank and communicates with the interior of said tank, said manifold being coupled to exhaust means whereby air may be withdrawn from between the bag and the tank wall thereby causing an empty bag to be held against the tank wall and effecting withdrawal from the tank of any vapour which may permeate the bags.

3. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein, said bag being so arranged as to communicate with one pair of filler and air release openings at one side of said piston, said bag being formed of flexible plastic material and being provided with plastic tubing wound helically about the cylindrical surface of said bag, said tubing being provided at spaced intervals with holes permitting the escape of air or vapor entrapped between the windings of the tube.

4. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein at each side of said piston, each of said bags being so arranged as to communicate at its open end with a pair of filler and air release openings at its respective side of the piston, and each bag being capable of occupying substantially the complete tank when filled, each of said bags being formed from polyethylene, polytetrafluorethylene or the like and being provided with plastic tubing wound helically about the cylindrical surface of said bags, said tubing being provided at spaced intervals with holes permitting the escape of air or vapor entrapped between windings of the tubing.

5. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein, said bag being so arranged as to communicate with one pair of filler and air release openings at one side of said piston, said bag being formed of polyethylene, polytetrafluorethylene or the like and being provided with plastic tubing arranged helically about the surface of the bag, said plastic tubing being provided at spaced intervals with holes permitting the escape of air or vapor entrapped between windings of the tubing, said tank being further characterized in that a vacuum manifold is arranged on the outer surface of the tank and communicates with the interior of said tank, said manifold being coupled to exhaust means whereby air may be withdrawn from between the bag and the tank wall thereby causing an empty bag to be held against the tank wall and effecting withdrawal of any vapor which may permeate the bag.

6. A bulk fluid transport tank comprising a main tank having a piston movable longitudinally therein, filler and air release openings in the tank, said openings being so arranged that in all positions of the piston there is a filler and air release opening in the tank at each side of said piston, said tank having a flexible bag therein at each side of said piston, each bag being so arranged as to communicate at its open end with a pair of filler and air release openings at its respective side of the piston and each bag being capable of occupying substantially the complete tank when filled, each of said bags being formed from polyethylene, polytetrafluorethylene or the like, and being provided with plastic tubing wound helically about the cylindrical surface of said bag, said tubing being provided at spaced intervals with holes permitting the escape of air or vapor entrapped between winds of the tubing, said tank being further characterized in that a vacuum manifold is arranged on the outer surface of the tank and communicates with the interior of said tank, said manifold being coupled to exhaust means whereby air may be withdrawn from between the bag and the tank wall thereby causing an empty bag to be held against the tank wall and effecting withdrawal from the tank of any vapor which may permeate the bags.

References Cited in the file of this patent
UNITED STATES PATENTS

| | | |
|---|---|---|
| 801,612 | Schramm | Oct. 10, 1905 |
| 1,235,550 | Carmody | Aug. 7, 1917 |
| 1,372,292 | Johnson | Mar. 22, 1921 |
| 2,437,618 | Schottgen et al. | Mar. 9, 1948 |
| 2,604,230 | Payne | July 22, 1952 |
| 2,742,197 | Walsh | Apr. 17, 1956 |
| 2,755,966 | Lindars | July 24, 1956 |
| 2,758,747 | Stevens | Aug. 14, 1956 |
| 2,798,639 | Urban | July 9, 1957 |
| 2,948,392 | Wadenby | May 16, 1961 |